(12) United States Patent
Yamada (10) Patent No.: US 8,417,098 B2
(45) Date of Patent: Apr. 9, 2013

(54) BROADCAST PROGRAM RECORDER

(75) Inventor: Daisuke Yamada, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1242 days.

(21) Appl. No.: 11/388,394

(22) Filed: Mar. 24, 2006

(65) Prior Publication Data

US 2006/0215993 A1    Sep. 28, 2006

(30) Foreign Application Priority Data

Mar. 28, 2005  (JP) ................. 2005-091947

(51) Int. Cl.
*H04N 5/76* (2006.01)

(52) U.S. Cl. .... 386/291; 386/212; 386/297; 386/E5.001

(58) Field of Classification Search .................... 386/83, 386/212, E5.001, 291; 725/58
See application file for complete search history.

(56) References Cited

U.S. PATENT DOCUMENTS

| | | | |
|---|---|---|---|
| 6,717,590 B1 | 4/2004 | Sullivan | |
| 2002/0146235 A1* | 10/2002 | Watanabe et al. | 386/52 |
| 2002/0174430 A1* | 11/2002 | Ellis et al. | 725/46 |
| 2005/0031307 A1* | 2/2005 | Kudo | 386/83 |
| 2005/0265169 A1* | 12/2005 | Yoshimaru et al. | 369/47.12 |
| 2006/0062550 A1* | 3/2006 | Lee | 386/83 |

FOREIGN PATENT DOCUMENTS

| | | |
|---|---|---|
| EP | 1355489 A2 | 3/2003 |
| EP | 1505832 A1 | 2/2005 |
| JP | 3088367 | 6/2002 |
| JP | 2003-319307 | 11/2003 |
| JP | 2004-180061 | 6/2004 |
| JP | 2004-274446 | 9/2004 |
| JP | 2004-343520 | 12/2004 |

OTHER PUBLICATIONS

Patent Abstracts of Japan, Publication No. 2004-343520, dated Dec. 2, 2004 (1 page).
Patent Abstracts of Japan, Publication No. 2003-319307, dated Nov. 7, 2003 (1 page).
Patent Abstracts of Japan, Publication No. 2004-180061, dated Jun. 24, 2004 (1 page).
Japanese Notice of Grounds of Rejection for patent application No. 091947/2005, mailed May 11, 2010, and English translation thereof, 4 pages.
Japan Patent Office Registered Utility Model Gazette for Utility Model Registration No. 3088367, Date of Registration: Jun. 19, 2002, 1 page.

(Continued)

*Primary Examiner* — Thai Tran
*Assistant Examiner* — Girumsew Wendmagegn
(74) *Attorney, Agent, or Firm* — Osha Liang LLP (57) ABSTRACT

A hard disk recorder that can help to configure a group of information of a periodically broadcasted program includes: a remote control receiver that receives an instruction from a user; a controller that determines whether an instruction to record a broadcast program also designates a periodical interval applied to record the broadcast program, and if so then determines a series ID common among a group of broadcast programs and depends on whether series ID is shared to search broadcast program title information for and retrieve information corresponding to group of broadcast programs, and generates a play list including the retrieved information; an antenna receiving a broadcast signal of a broadcast program; a tuner extracting a broadcast signal; a HD device recording a series ID, broadcast program title information, and a broadcast signal in association with each other; and a video output device outputting the play list.

6 Claims, 9 Drawing Sheets

OTHER PUBLICATIONS

European Search report in corresponding European Patent application # 1715685 filed with the European Patent Office dated Jul. 7, 2010. 7 page.
Office Action in Japanese Patent Application No. 091947/2005 mailed Dec. 7, 2010, with English translation thereof (5 pages).
Patent Abstract in Japanese Publication No. 2004-274446 Publication date Sep. 30, 2004 (1 page).
Office Action for European Application No. 06006167.8 dated May 6, 2011 (7 pages).
Summons to Attend Oral Proceedings Pursuant to Rule 115(1)EPC for European Application No. 06006167.8 dated Nov. 22, 2011 (6 pages).

* cited by examiner

| ID | USE | TITLE |
|---|---|---|
| 1 | 0 | |
| 2 | 0 | |
| ... | ... | |
| 10 | 0 | |
| ... | ... | |
| 30 | 0 | |
| 31 | 1 | SOCCER |
| ... | ... | |
| 101 | 0 | |
| ... | ... | |
| 300 | 1 | PROFESSIONAL BASEBALL |

FIG.6

| ID | USE | TITLE |
|---|---|---|
| 1 | 1 | PROJECT WZ |
| 2 | 0 | |
| ... | ... | |
| 10 | 0 | |
| ... | ... | |
| 30 | 0 | |
| 31 | 1 | SOCCER |
| ... | ... | |
| 101 | 0 | |
| ... | ... | |
| 300 | 1 | PROFESSIONAL BASEBALL |

FIG.7

| ID | CHANNEL | WHAT DAY OF THE WEEK | START | END | TITLE |
|---|---|---|---|---|---|
| 1 | 2 | THURSDAY | 24:00 | 25:00 | PROJECT WZ/TSUGARU STRAIT BRIDGE (1ST PART) |
| 31 | 6 | TUESDAY | 19:00 | 21:00 | SOCCER |
| 1 | 2 | THURSDAY | 24:00 | 25:00 | PROJECT WZ/TSUGARU STRAIT BRIDGE (2ND PART) |
| 1 | 2 | THURSDAY | 24:00 | 25:00 | PROJECT WZ/IN PURSUIT OF PICOTECHNOLOGY ! |
| 300 | 10 | WEDNESDAY | 19:00 | 21:30 | PROFESSIONAL BASEBALL |
| 1 | 2 | THURSDAY | 24:00 | 25:00 | PROJECT WZ/MOBILE PHONES OF 10 BILLION PEOPLE |

BROADCAST PROGRAM RECORDER

BACKGROUND OF THE INVENTION

1. Field of the Invention

The present invention relates generally to broadcast program recorders and particularly to television broadcast program recorders.

2. Description of the Background Art

Japanese Patent Laying-Open No. 2004-343520 discloses a content recording and reproduction management device including: a storage storing a series management table having recording status information registered therein to indicate for each content broadcasted from its sender whether the content has been recorded; and a controller that registers in the series management table for series contents broadcasted by the sender regularly over a prescribed period of time a series ID indicative of information specifying the series contents and an episode number indicating which episode a series content corresponds to, and that registers the recording status information in the series management table for each episode number. As disclosed in the publication, the series content can be recorded/reproduced without cumbersome user operation and hence readily controlled.

Japanese Patent Laying-Open No. 2003-319307 discloses a recorder and reproducer including an input device operated to previously set a broadcast program that is recorded in a storage medium, and a display device displaying in a list the information of a broadcast program preselected to be recorded, that of a recorded broadcast program, and other similar information, and the recorder and reproducer is characterized in that the display device displays an identification mark uniquely provided to the broadcast program preselected to be recorded and displays an identification mark for a broadcast program for which update recording is set. As disclosed in the publication, the broadcast program for which updating recording is set can be readily identified.

Japanese Patent Laying-Open No. 2004-180061 discloses a data recorder and reproducer that has a storage medium recording content at least including coded video data and is capable of recording, reproducing and editing video data. As disclosed in the publication, once recording a broadcast program has been programmed, the broadcast program can be recorded at any interval and content recorded in the storage medium also be updated without user operation.

As disclosed in Japanese Patent Laying-Open No. 2004-343520, however, it is difficult to configure a group of information of a program broadcasted periodically.

Japanese Patent Laying-Open Nos. 2003-319307 and 2004-180061 in the first place fail to consider configuring a group of information of recorded broadcast program.

SUMMARY OF THE INVENTION

The present invention has been made to overcome the above described disadvantages and it contemplates a broadcast program recorder that can readily configure a group of information of a program broadcasted periodically.

In order to achieve the above object the present invention in an aspect provides a broadcast program recorder including: a receiver receiving an instruction from a user; a determinator determining whether an instruction received by the receiver to record a broadcast program also designates a periodical interval applied to record the broadcast program; a determinator operative in response to the instruction also designating a periodical interval applied to record the broadcast program to determine identification information identifying a broadcast program by any of prescribed information such that the identification information is common among a group of broadcast programs to be recorded in accordance with the instruction; a receiver receiving a broadcast signal of a broadcast program; a selector selecting from a broadcast signal(s) of a broadcast program(s) received by the receiver a broadcast signal of a broadcast program represented by the instruction; a recording device recording the identification information, prescribed information of the broadcast program selected by the selector, and the broadcast signal of the broadcast program selected by the selector, in association with each other; a searcher and retriever depending on whether the identification information is common to search through the prescribed information for and retrieve information corresponding to the group of broadcast programs; a first generator generating a group of information to include the information retrieved by the retriever; and an output device outputting at least one of the broadcast signal recorded by the recording device and the group of information generated by the first generator.

The present invention in another aspect provides a broadcast program recorder including: a receiver receiving an instruction from a user; a determinator determining whether an instruction received by the receiver to record a broadcast program also designates a periodical interval applied to record the broadcast program; a determinator operative in response to the instruction also designating a periodical interval applied to record the broadcast program to determine identification information identifying a broadcast program such that the identification information is at least partially common among a group of broadcast programs to be recorded in accordance with the instruction; a receiver receiving a broadcast signal of a broadcast program; a selector selecting from a broadcast signal(s) of a broadcast program(s) received by the receiver a broadcast signal of a broadcast program represented by the instruction; a recording device recording the identification information, prescribed information of the broadcast program selected by the selector, and the broadcast signal of the broadcast program selected by the selector, in association with each other; a searcher and retriever depending on whether the identification information is at least partially common to search through the prescribed information for and retrieve information corresponding to the group of broadcast programs; a first generator generating a group of information to include the information retrieved by the retriever; and an output device outputting at least one of the broadcast signal recorded by the recording device and the group of information generated by the first generator.

Preferably the identification information includes information identifying a broadcast program independently of when the broadcast program is recorded.

Preferably the information identifying the broadcast program independently of when the broadcast program is recorded includes information identifying the broadcast program by any of prescribed information.

Preferably the recording device includes a device recording the identification information, the prescribed information of the broadcast program selected by the selector. In addition, preferably the broadcast signal of the broadcast program selected by the selector, and in addition thereto information associated with the identification information, the broadcast program recorder further comprises a second generator generating a group of the information associated with the identification information. In addition, preferably the output device includes an output device outputting at least one of the broadcast signal recorded by the recording device and the group of information generated by the first generator, and in addition thereto the group of the information associated with the identification information.

Preferably the second generator includes a generator generating the group of the information associated with the identification information if a condition is satisfied.

Preferably the generator generating the group of the information associated with the identification information includes a generator generating the group of the information associated with the identification information if the instruction indicates that the group of the information associated with the identification information should be generated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter reference will be made to the drawings to describe the present invention in embodiments. In the following description, identical components are identically denoted. Their names and functions are also identical.

First Embodiment

Figure 1:
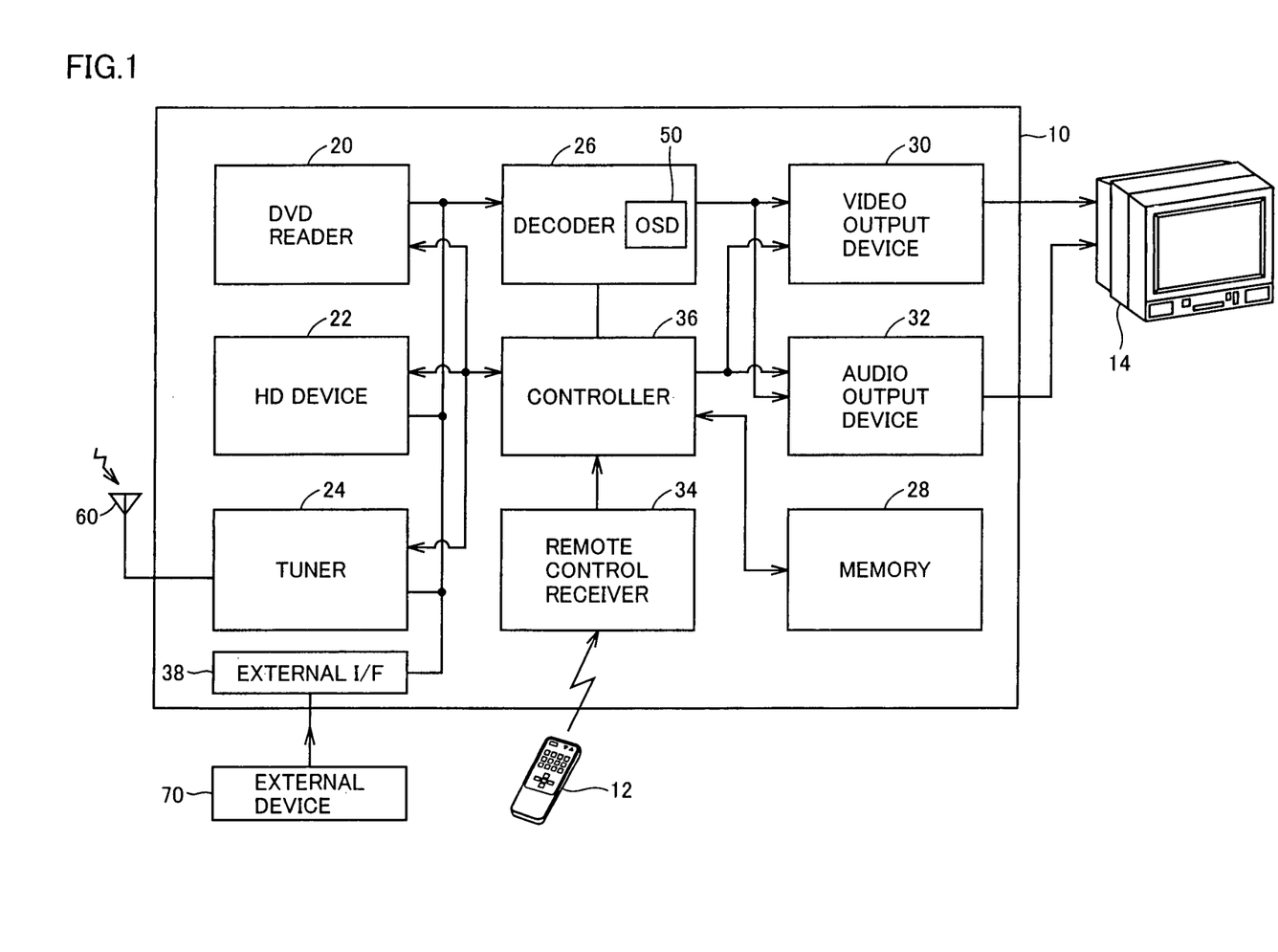
FIG. 1 generally shows a configuration of a hard disk recorder in a first embodiment of the present invention.

FIG. 1 shows a hard disk recorder 10, which is a broadcast program recorder that incorporates two types of digital storage medium reproduction devices and outputs content reproduced from a storage medium and other similar, variety of supplied contents to a television receiver 14 previously connected external to the recorder in the form of a video or audio signal and hence viewably or audibly. A remote controller 12 is a device operated by a user to input a variety of instructions and transmits infrared signals corresponding to the instructions.

Hard disk recorder 10 includes a digital versatile disk (DVD) reader 20, a hard disk (HI) device 22, a tuner 24 having connected thereto an external antenna 60 receiving a digital broadcast signal transmitted from a broadcast station, a decoder 26 having an on screen display (OSD) incorporated therein, a memory 28, a video output device 30, an audio output device 32, a remote control receiver 34, a controller 36, an external interface (I/F) 38 having an external device 70 connected thereto to supply externally received digital information.

DVD reader 20 is a device-reading information of digital content recorded in an optical disk (in the present embodiment, a DVD disk). In the present embodiment the DVD disk has any information (in the present embodiment, information of digital content) recorded therein.

HD device 22 records at least three types of information and reads the recorded signals. First information is ID attribute information, as will more specifically be described hereinafter. Second information includes a title of a broadcast program to be recorded, the program's category, series ID, broadcast signal, and recording time. Third information represents a play list, as will be described hereinafter. Note herein that the hard disk records a broadcast signal including e.g., a video file conforming to Motion Picture Experts Group 2 (MPEG 2) standard, an audio file conforming to MPEG-1 Audio Layer 3 (MP3) standard and the like's signal.

When antenna 60 receives a digital broadcast signal of a broadcast program originated from a broadcast station, tuner 24 selects and outputs a broadcast signal (a signal of the digital content) of a channel designated by controller 36.

Decoder 26 receives any of a signal of digital content reproduced by DVD reader 20, a broadcast signal read by HD device 22 from a hard disk, the broadcast signal selected by tuner 24, and a signal of digital content received through external I/F 38 from external device 70, as switched as controlled by controller 36, and decodes and outputs the signal. Decoder 26 has OSD 50 incorporated therein to generate image data as based on information provided from controller 36 and output the image data to video output device 30 to visibly display the image data on a screen of television receiver 14.

Memory 28 has stored therein a broadcast channel selectable by tuner 24. The broadcast channel is obtained by previous channel scan (auto scan). Furthermore memory 28 also has an operation program of controller 36 stored therein. Memory 28 also has a flag, data and the like stored therein for processing information, as described hereinafter.

Video output device 30 converts a video signal decoded by decoder 26 (including any of a broadcast signal recorded by HD device 22 and a play list generated by controller 36) to a video signal that can be output by television receiver 14, and outputs it to television receiver 14.

Audio output device 32 converts an audio signal decoded by decoder 26 to an audio signal that can be output by television receiver 14, and outputs it to television receiver 14.

Remote control receiver 34 receives a variety of instruction signals transmitted from remote controller 12 through an infrared ray and transmits the instruction signals to controller 36. Thus remote control receiver 34 serves as a device receiving user instructions. Controller 36 controls each device in accordance with the operation program stored in memory 28.

Figure 2:
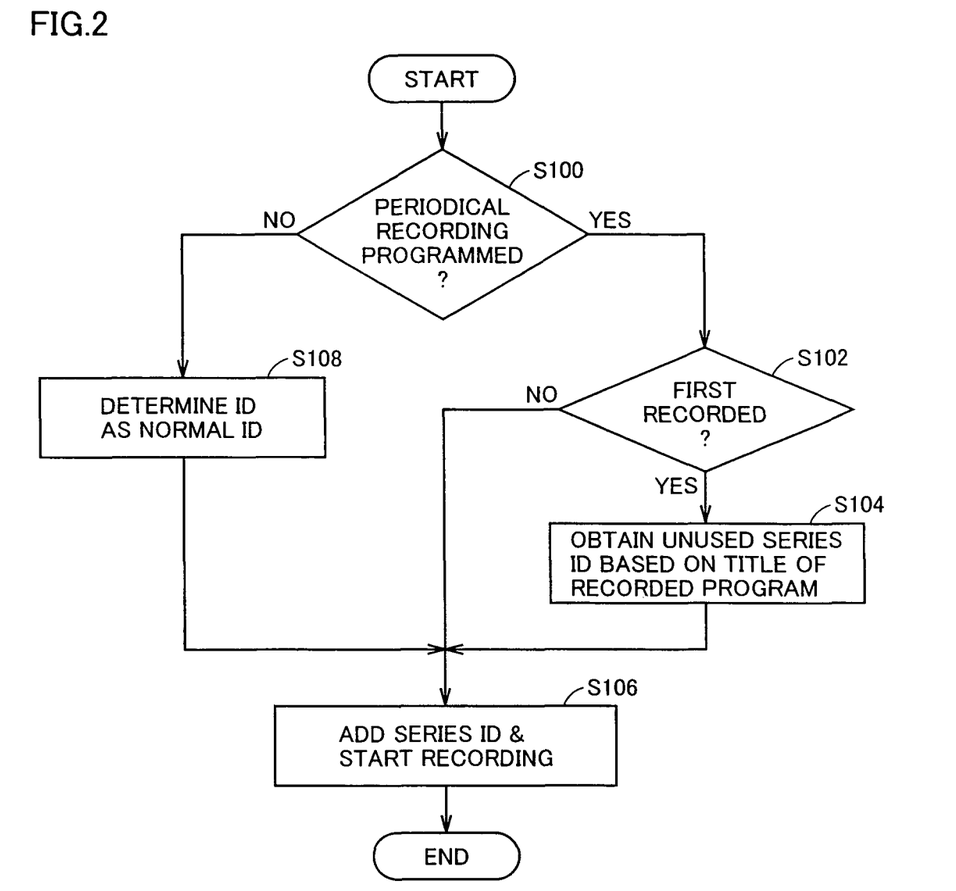
FIG. 2 is a flow chart of a procedure followed to control a recording process performed by the hard disk recorder in the first embodiment of the present invention.

With reference to FIG. 2, hard disk recorder 10 executes a program exerting the following control for recording.

At step (S) 100 controller 36 refers to memory 28 to determine whether a recording to be next performed is a recording programmed to be done periodically, i.e., for a program broadcast periodically, such as a serialized drama, a series formed of a group of broadcast programs, and the like. If so (YES at S100), the process proceeds to S102. Otherwise (NO at S100) the process proceeds to S108.

At S102 controller 36 refers to ID attribute information stored in HD device 22 to determine whether the broadcast program for which periodical recording is programmed is first recorded. In the present embodiment, controller 36 make this decision from whether a series ID (i.e., a type of identification information that specifies a broadcast program for which periodical recording is programmed) has been set. If so (YES at S102), the process proceeds to S104. Otherwise (NO at S102) the process proceeds to S106. In the present embodiment, if in actuality a series of broadcast programs is recorded, and once how the broadcast programs are recorded, as programmed, has been changed (excluding changing when to terminate a recording while it proceeds), then the subsequent programming to record a broadcast program is regarded as being done to first record the broadcast program.

At S104 controller 36 refers to ID attribute information to search for a series ID that is unused. When such series ID has been retrieved, controller 36 updates the ID attribute information to set the retrieved series ID to be that of the broadcast program for which a decision is made at S102 as to whether it is first recorded. Thus an unused series ID is obtained. In the present embodiment a series ID does not depend on a recording date or time, since a broadcast program for which recording is programmed is recorded by HD device 22 (i.e., a series ID is not required to specify a recording date and time as the hard disk's data is periodically updated so that an earlier recorded broadcast program is recorded to a preceding address.)

At S106 when a time programmed for recording has arrived, tuner 24 selects a broadcast signal of a broadcast program for which recording is programmed (i.e., a broadcast program indicated by an instruction to record it) from broadcast signals of broadcast programs received by antenna 60. HD device 22 records a series ID or a normal ID, prescribed information of a broadcast program selected by turner 24 (in the present embodiment, the information corresponds to: a channel; on what day of the week a recording is done; a time at which the recording is started; and a title of a broadcast program received in programming to record the broadcast program), and a broadcast signal of a broadcast program selected by tuner 24 such that they are associated with each other. When the recording ends, controller 36 causes HD device 22 to also record in association with the broadcast program's broadcast signal a time at which the recording ends. If in programming to record a broadcast program its category is received, controller 36 causes HD device 22 to also record the category's information in association with the broadcast program's broadcast signal.

At S108 controller 36 refers to ID attribute information to search for an unused normal ID (i.e., a type of identification information that specifies a broadcast program for which periodical recording is not programmed). Once such normal ID has been retrieved, controller 36 updates the ID attribute information to set the retrieved normal ID to be a normal ID of the broadcast program for which a decision is made at S102 as to whether it is first recorded. Thus the normal ID is determined as an ID.

Figure 3:
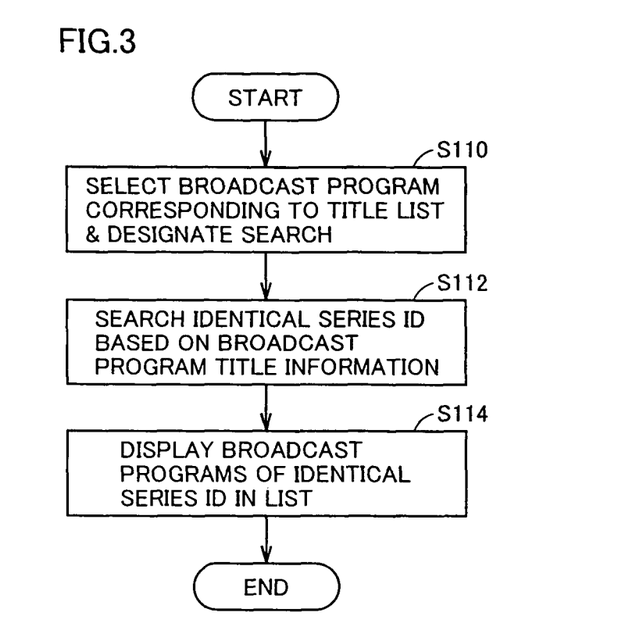
FIG. 3 is a flow chart of a procedure followed to control a process to display a broadcast program having an identical series ID, as provided in the first embodiment of the present invention.

With reference to FIG. 3, hard disk recorder 10 executes a program exerting the following control to display a broadcast program having an identical series ID.

At S110 remote control receiver 34 receives an instruction from a user to display a title(s). In response, controller 36 reads broadcast program title information from information recorded by HD device 22 and outputs the broadcast program title information to OSD 50. OSD 50 generates image data from the broadcast program title information and outputs the image data to television receiver 14. Television receiver 14 displays the broadcast program title information. The user operates remote controller 12 to issue an instruction to extract a particular broadcast program, and remote control receiver 34 receives the instruction.

At S112 controller 36 searches broadcast program title information recorded by HD device 22. The information may be any information that has been recorded together with series ID, although in the present embodiment it is described as broadcast program title information. More specifically, controller 36 searches for a broadcast program represented by an instruction received at S110 to extract a particular broadcast program. Thus controller 36 searches broadcast program title information (i.e., prescribed information of a broadcast program selected by tuner 24) for information corresponding to a group of broadcast programs having a common ID.

At S114 controller 36 reads from information recorded by HD device 22 the broadcast program title information retrieved at S112 and outputs the information to OSD 50. Controller 36 records the information to memory 28 in the same order as television receiver 14 displays titles. OSD 50 generates image data from the information and outputs the image data to television receiver 14. Television receiver 14 displays the information.

Figure 4:
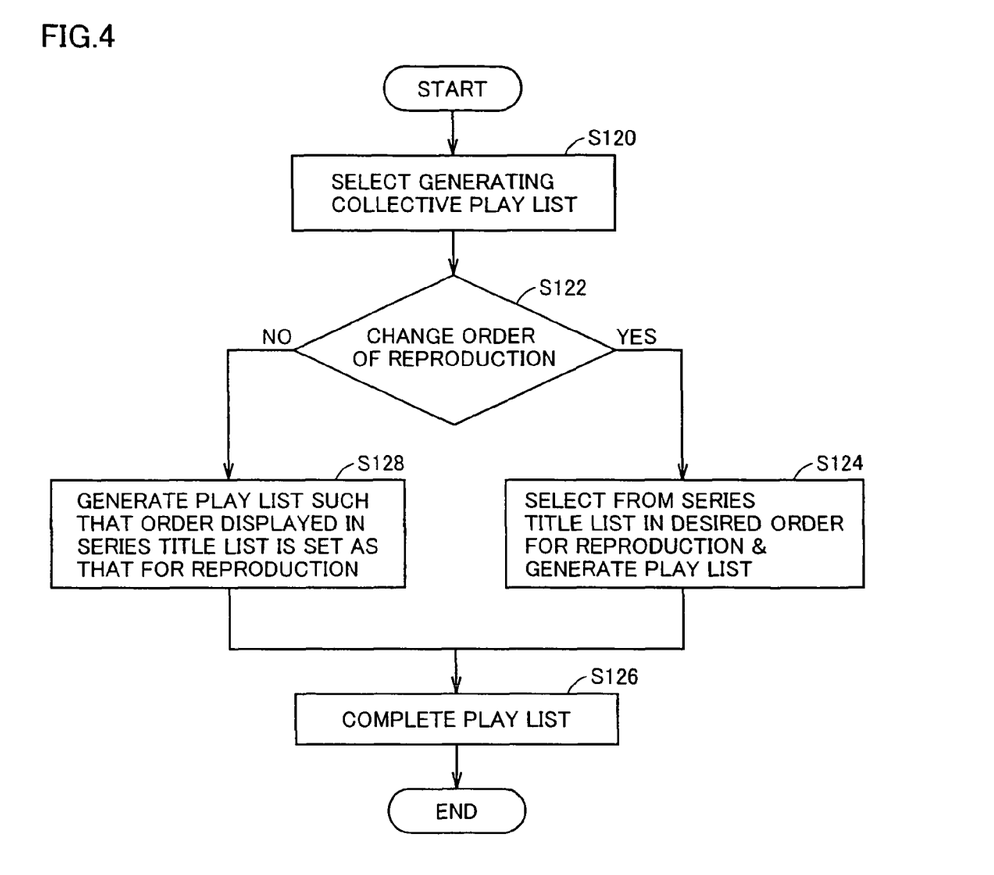
FIG. 4 is a flow chart of a procedure followed to control a play list generation process in the first embodiment of the present invention.

With reference to FIG. 4, hard disk recorder 10 executes a program exerting the following control to generate a play list.

At S120 remote control receiver 34 receives an instruction from a user to make a collective play list in accordance with a predetermined procedure. In the present embodiment when remote control receiver 34 receives a signal indicating that "generate a collective play list" has been selected in a menu previously displayed by television receiver 14, controller 36 determines that remote control receiver 34 has received an instruction to "generate a collective play list."

At S122 remote control receiver 34 receives an instruction from the user and controller 36 in response determines whether the instruction indicates that a broadcast program included in the play list should be reproduced in a different order. If so (YES at S122) the process proceeds to S124. Otherwise (NO at S122) the process proceeds to S128.

At S124 controller 36 updates an order in the broadcast program title information recorded in memory 28 (i.e., the information recorded at S114) to correspond to an order of a broadcast program represented by the instruction received at S122 (indicating a change in reproduction). When the information's order has been updated, controller 36 reads from HD device 22 information of a category and a recording time of the broadcast program having information recorded at S114. When the information of the category and that of the recording time are read, controller 36 records them to memory 28 in association with that of the title of the broadcast program. Thus a play list (i.e., information representing an order of reproduction) is partially generated.

At S126 controller 36 copies to HD device 22 a portion of the play list having recorded in memory 28. When controller 36 completes copying it, controller 36 updates information recorded in HD device 22 to associate each information configuring a portion of the play list with a broadcast signal having recorded in HD device 22. Thus a play list completes. Controller 36 will form a group of information to include information of a title of a broadcast program that controller 36 has retrieved itself.

At S128 controller 36 reads from H) device 22 information of a category and a recording time of the broadcast program having information recorded at S114. When the information of the category and that of the recording time are read, controller 36 records them to memory 28 in association with that of the title of the broadcast program. Thus a play list is partially generated.

In accordance with the configuration and flow chart as described above hard disk recorder 10 operates as described hereinafter.

Figure 5:
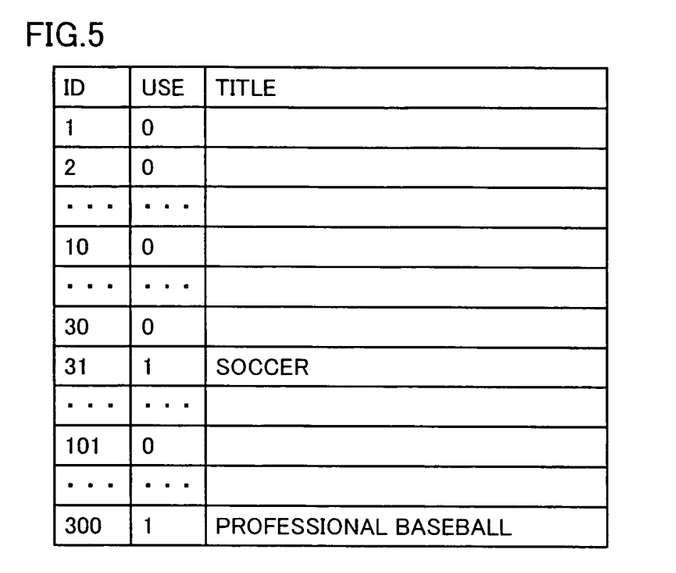
FIG. 5 specifically represents ID attribute information provided in a first embodiment of the present invention when whether a broadcast program is first recorded is determined.
Figure 6:
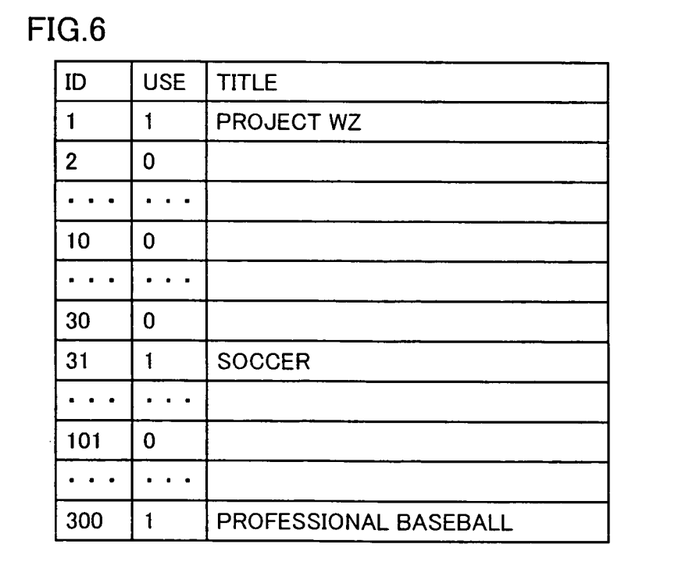
FIG. 6 specifically represents ID attribute information provided in the first embodiment of the present invention when a series ID is obtained.

Controller 36 refers to memory 28 to determine whether a recording to be next performed is a recording programmed to be periodically done (S100). Thus controller 36 determines whether remote control receiver 34 receives an instruction to record a broadcast program that also designates a periodical interval applied to record the broadcast program. If so (YES at S100), controller 36 refers to ID attribute information to determine whether a broadcast program for which periodical recording is programmed is first recorded (S102). If so (YES at S102) controller 36 obtains an unused series ID (S104). FIG. 5 specifically represents ID attribute information provided when a decision is made as to whether a broadcast program for which periodical recording is programmed is first recorded. The present embodiment provides a series ID having ID numbers "1" to "30" and a normal ID having ID numbers "31" to "300" for the sake of illustration. In this example no series ID is used, and controller 36 sets "1" as a series ID of a broadcast program to be subsequently recorded. Thus if an instruction issued to record a broadcast program also designates a periodical interval applied to record the broadcast program, controller 36 determines a series ID specifying by any of prescribed information a group of broadcast programs recorded by that instruction. FIG. 6 specifically represents the ID attribute information obtained when a series ID is obtained. As a title corresponding to ID "1", "Project WZ" is defined. (Although not shown, it is also defined for example on what day of the week a recording corresponding to ID "1" is done). Thus controller 36 determines a series ID specifying a broadcast program in accordance with a result that it has made. Also note that the series ID is a character string predetermined in accordance with whether the broadcast program is that broadcasted periodically.

Figure 7:
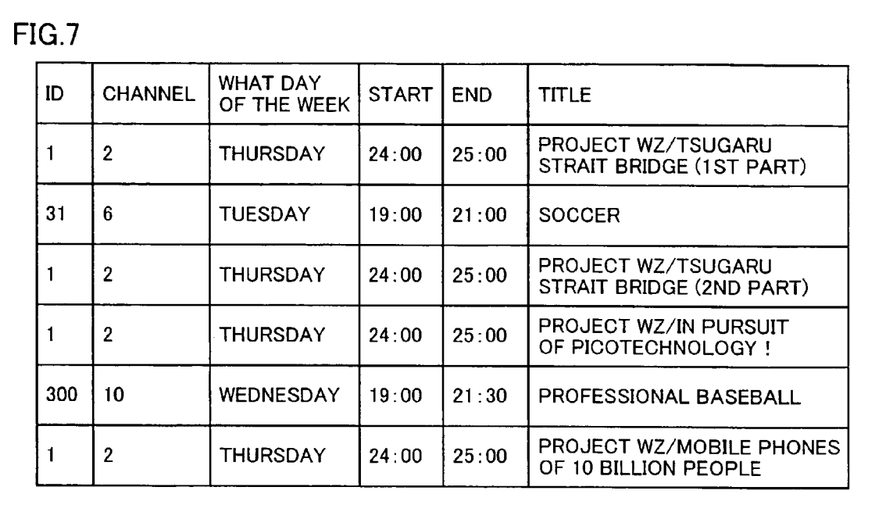
FIG. 7 indicates specific broadcast programs recorded in an HD device in the first embodiment of the present invention.

When the series ID has been obtained and a time preset for recording has arrived, tuner 24 selects from a broadcast signal received by antenna 60 a broadcast signal of a broadcast program for which recording is programmed. HD device 22 records a series ID or a normal ID, a channel, the day of the week on which a recording is done, a time at which the recording is started, a title of a broadcast program received in programming to record the broadcast program, and the broadcast signal of the broadcast program selected by tuner 24, in association with each other. When the recording ends, controller 36 causes HD device 22 to also record in association with the broadcast program's broadcast signal a time at which the recording ends. If in programming to record a broadcast program its category is received, controller 36 causes HD device 22 to also record the category's information in association with the broadcast program's broadcast signal. If in programming to record a broadcast program its category is received, the category's information is also recorded in association with the broadcast program's broadcast signal (S106). If recording is done more than once, S100-S106 are repeated. Ultimately, a plurality of broadcast programs will be recorded. FIG. 7 specifically indicates broadcast programs recorded thereafter by HD device 22 as broadcast signal.

Figure 8:
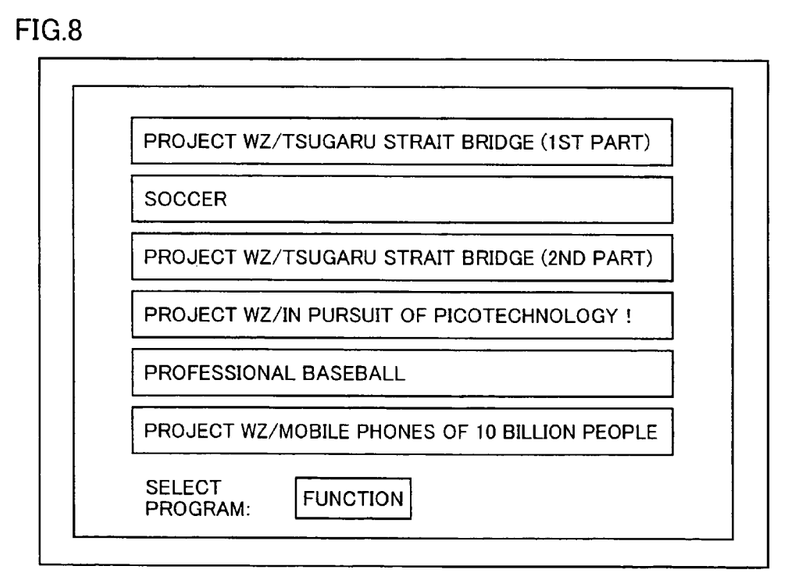
FIG. 8 shows a screen allowing a television receiver to display a title in the first embodiment of the present invention.

After the plurality of broadcast programs has been recorded, remote control receiver 34 receives an instruction from the user to display titles. In response, controller 36 causes television receiver 14 to display broadcast program title information. FIG. 8 shows a screen of television receiver 14 provided at that time. When such information is displayed, the user operates remote controller 12 to issue an instruction to extract a particular broadcast program, and remote control receiver 34 receives the instruction (S110).

Figure 9:
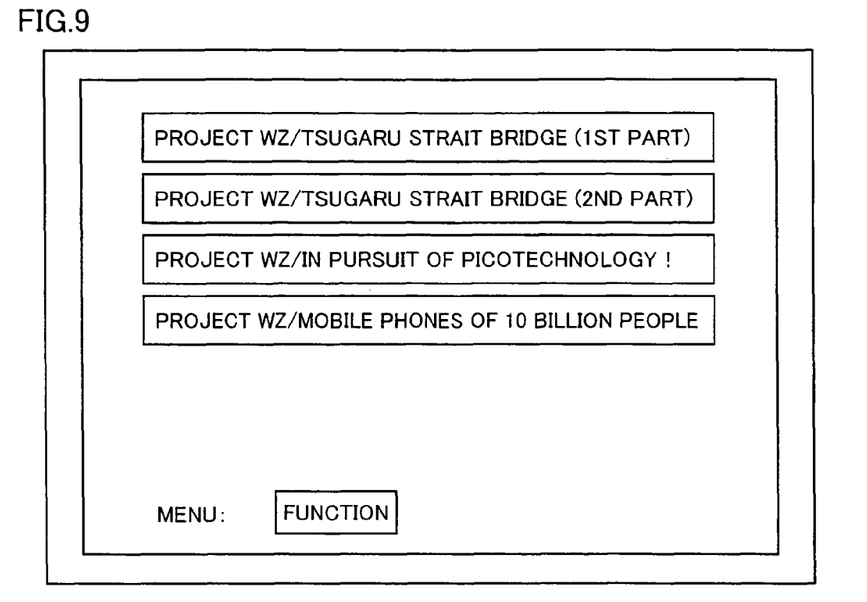
FIG. 9 shows a screen allowing a television receiver to display a title of a searched and retrieved broadcast program in the first embodiment of the present invention.

When the instruction is received, controller 36 searches broadcast program title information recorded by HD device 22. Controller 36 searches for a broadcast program represented by an instruction received at S110 to extract a particular broadcast program (S112). When the information has been retrieved, television receiver 14 displays the information in a list (S114). FIG. 9 shows a screen of television receiver 14 displayed at that time.

Figure 10:
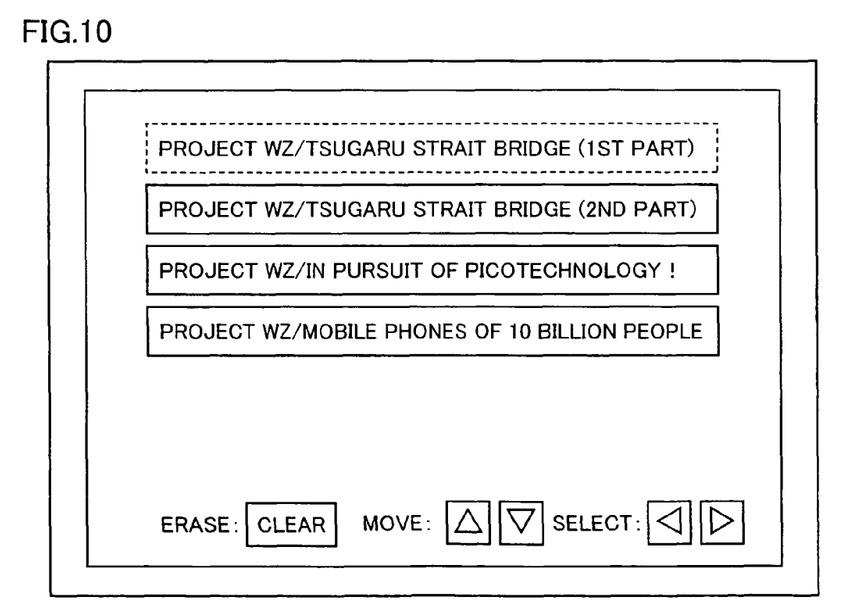
FIG. 10 shows a screen of a television receiver displayed in the first embodiment of the present invention when an instruction is received to generate a collective play list.

When the list is displayed, remote control receiver 34 receives an instruction to generate a collective play list (S120). FIG. 10 shows a screen of television receiver 14 displayed when the instruction to generate the collective play list is received. A broadcast program to be edited, which is "Project WZ/Tsugaru Strait Bridge (1st part)" in this example, is surrounded by a broken line.

Figure 11:
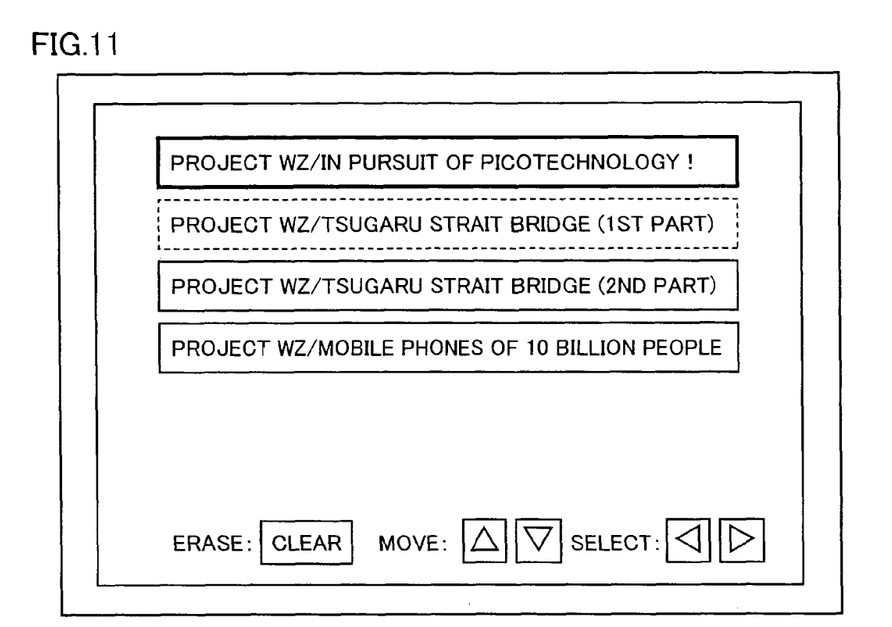
FIG. 11 shows a screen of a television receiver displayed in the first embodiment of the present invention when an order of reproducing a broadcast program is changed.
Figure 12:
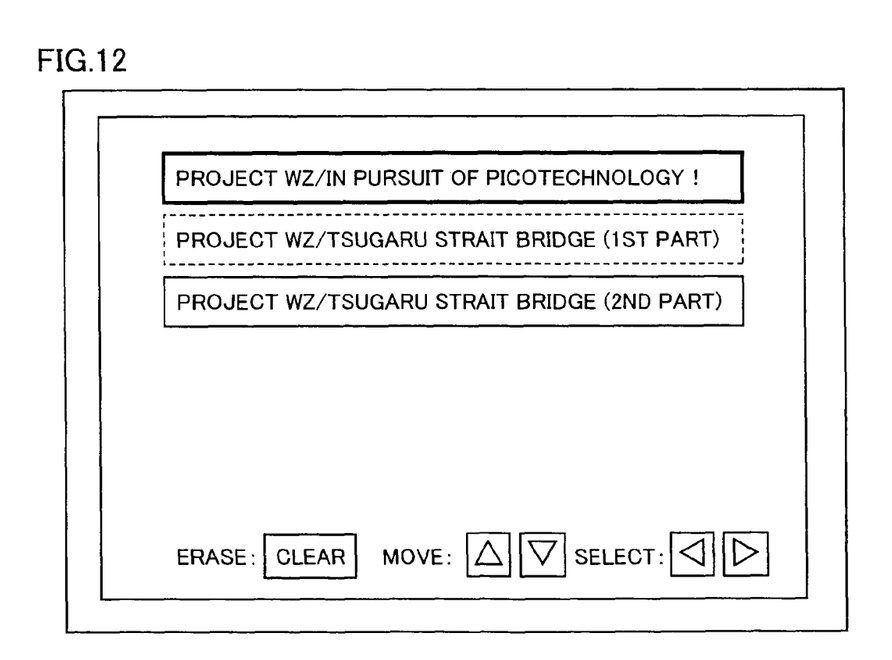
FIG. 12 shows a screen of a television receiver displayed in the first embodiment of the present invention when a hard disk recorder receives an instruction to delete a broadcast program.

When the instruction is received, remote control receiver 34 again receives an instruction from the user. When the instruction is received, controller 36 determines the instruction indicates that a broadcast program included in the play list should be reproduced in a different order (S122). More specifically, the user presses a cursor key (not shown) of remote controller 12 that moves a cursor upward and downward. In response, controller 36 determines that an instruction has been issued to reproduce in a different order the broadcast program shown on the FIG. 10 screen that is encircled by the broken line. If a key moving the cursor rightward and leftward is pressed, controller 36 determines that an instruction has been issued to change the broadcast program to be edited (i.e., a broadcast program indicated on a screen of television receiver 14 that is encircled by a broken line). When the user presses the CLEAR key (not shown) of remote controller 12, controller 36 determines that an instruction has been issued to delete from HD device 22 the information of the broadcast program indicated on the screen of television receiver 14 that is encircled by the broken line. FIG. 11 shows a screen of television receiver 14 displayed when an instruction has been received to first reproduce "Project WZ/In Pursuit of Picotechnology". FIG. 12 shows a screen of television receiver 14 displayed after an instruction is received to delete "Project WZ/Mobile Phone of 10 billion people". If in that case a cursor key is pressed (or the user issues an instruction to reproduce in a different order a broadcast program included in a play list) (YES at S122), controller 36 generates a portion of a play list to correspond to an order of a broadcast program that is indicated by the instruction designating a change in reproduction (S124).

When the play list is partially generated, controller 36 associates each information configuring a portion of the play list with a broadcast signal having recorded in HD device 22. The play list thus completes (S126).

Thus the present embodiment provides a hard disk recorder that can operate in response to a user instruction to readily generate a play list of a plurality of broadcast programs recorded periodically as programmed. This would contribute to a less cumbersome user operation. The play list of the plurality of broadcast programs recorded periodically as pre-programmed can be readily generated because a series ID is used. The series ID is not information obtained from Electronic Program Guide (EPG). Thus if a broadcast is not a digital broadcast, its content can be displayed in a list. As a result, a broadcast program recorder can be provided that can help to configure a group of information of a periodically broadcasted program.

Note that in FIGS. 9-12 the play list may include a thumbnail.

Furthermore, the identification information may not be a series ID. If information other than the series ID is used as the identification information, the identification information desirably includes information identifying a broadcast program independently of when the broadcast program is recorded. One example of such identification information is information including a character string common among broadcast programs recorded in accordance with a single instruction and a character string each unique to a single broadcast program. A more specific example of such information is a character string such as "12-A". This character string has a numerical portion, which is a character string common among broadcast programs recorded in accordance with a single instruction, and an alphabetical portion, which is a character string each unique to a single broadcast program. If such a character string is used as identification information, controller 36 will determine the identification information to at least have a portion (in this example, "12") common among a group of broadcast programs recorded in accordance with an instruction also designating a periodical interval applied to record the broadcast programs. In accordance with whether the identification information at least has a portion (in this example, "12") that is common, controller 36 searches for information of a title of a broadcast program (i.e., information corresponding to a group of broadcast programs) and the like.

Second Embodiment

In the present embodiment HD device 22 records the information described in the first embodiment, and in addition thereto broadcast program title information. This information is information associated with a series ID. Note that the remainder in hardware configuration is identical to that described in the first embodiment. It is functionally also identical.

Figure 13:
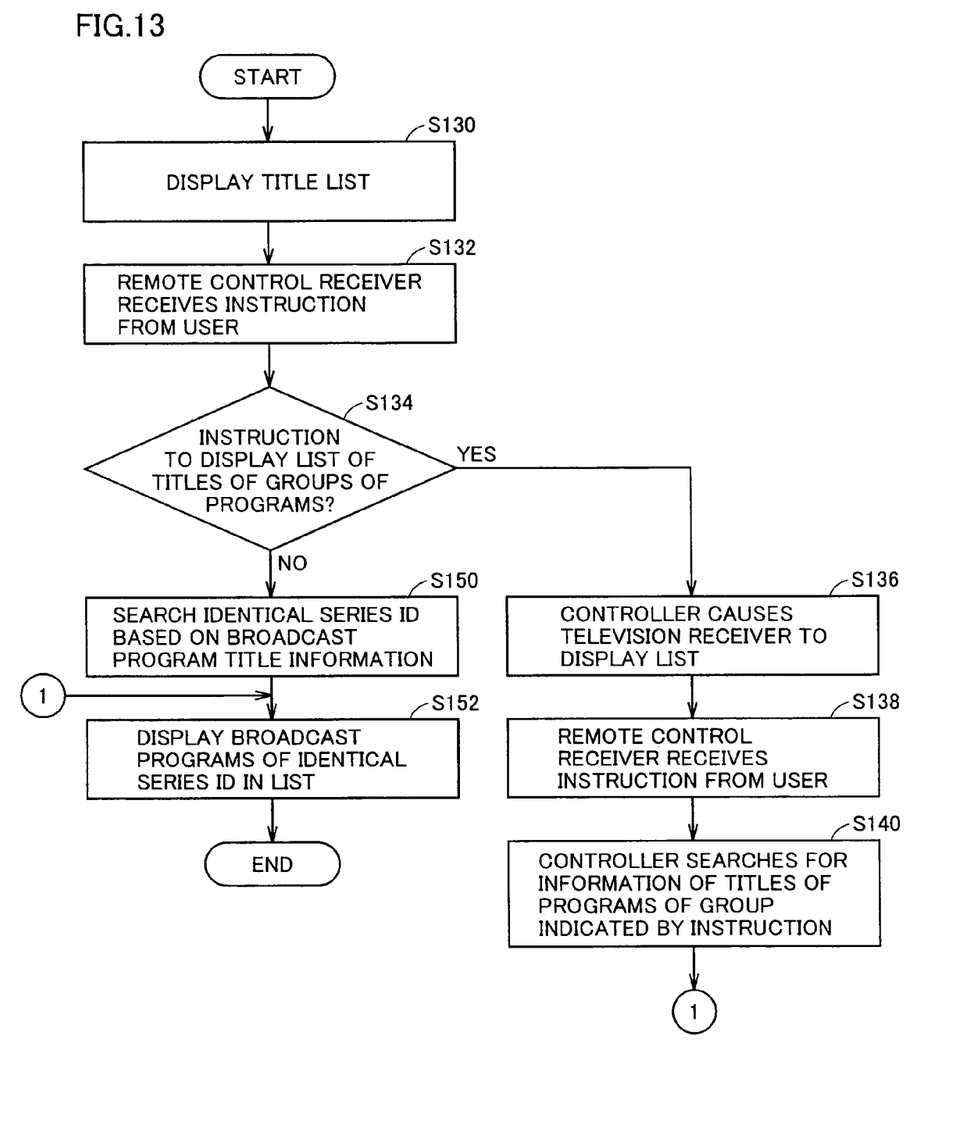
FIG. 13 is a flow chart of a procedure followed to control a process to display a broadcast program having an identical series ID, as provided in a second embodiment of the present invention.

With reference to FIG. 13 hard disk recorder 10 executes a program exerting the following control to display a broadcast program having an identical series ID.

At S130 remote control receiver 34 receives an instruction from a user to display a title(s). In response, controller 36 reads broadcast program title information from information recorded by HD device 22 and outputs the read information to OSD 50. OSD 50 receives the information, and therefrom generates image data and outputs it to television receiver 14. Television receiver 14 receives and displays the information.

At S132 remote control receiver 34 receives an instruction from the user via remote controller 12.

At S134 controller 36 determines whether the instruction is an instruction to display a list of group titles each corresponding to a group of broadcast programs. If so (YES at S134) the process proceeds to S136. Otherwise (NO at S134) the process proceeds to S150.

At S136 controller 36 reads broadcast program title information and series ID information stored by HD device 22. Note that the read "broadcast program title information" is information associated with series ID. When controller 36 has read the broadcast program title information and the series ID information, controller 36 generates title list information from the read broadcast program title information. In the present embodiment controller 36 generates the title list information to satisfy the following requirements: A first requirement is that a single title correspond to a single type of series ID and a single group of broadcast programs. A second requirement is that of broadcast programs having the same series ID, the title of the broadcast program first recorded be included in the title list. A third requirement is that the order of titles correspond to that of ID numbers. Thus controller 36 will form a group of information of titles of broadcast programs as based on information recorded by HD device 22. The group will represent a type of a group of broadcast programs. Controller 36 then outputs the title list information to OSD 50. OSD 50 receives the information and therefrom generates image data representing the title list and outputs the image data to television receiver 14. Television receiver 14 displays the title list information.

At S138 remote control receiver 34 receives an instruction from the user to display a title of a broadcast program associated with a group of broadcast programs represented by one of titles included in the title list. Remote control receiver 34 receives the instruction via remote controller 12.

At S140 controller 36 searches broadcast program title information. (The information may be any information that is recorded together with a series ID, although in the present embodiment it is described as broadcast program title information.) In the present embodiment the broadcast program title information is recorded in HD device 22. More specifically, controller 36 searches for a group of broadcast programs represented by an instruction received from the user. Thus in response to an instruction received by remote control receiver 34 controller 36 searches broadcast program title information (i.e., prescribed information of a broadcast program selected by tuner 24) for information corresponding to the group of broadcast programs.

At S150 controller 36 searches broadcast program title information recorded by HD device 22. The information may be any information that has been recorded together with a series ID, although in the present embodiment it is described as broadcast program title information. More specifically, controller 36 searches for a broadcast program represented by an instruction received at S130 to extract a particular broadcast program. Thus controller 36 searches broadcast program title information (i.e., prescribed information of a broadcast program selected by tuner 24) for information corresponding to group of broadcast programs having a common ID.

At S152 controller 36 reads from information recorded by HD device 22 the broadcast program title information that controller 36 itself has retrieved, and outputs the information to OSD 50. Controller 36 records the information to memory 28 in the same order as television receiver 14 displays titles. OSD 50 generates image data from the information and outputs the image data to television receiver 14. Television receiver 14 displays the information.

Note that the remainder of the process flows in the same manner as described in the first embodiment and is also identical in function.

In accordance with the above described configuration and flow chart hard disk recorder 10 operates as described hereinafter.

When an instruction to display a title(s) is received by remote control receiver 34, controller 36 causes television receiver 14 to display broadcast program title information (S130). When the information is displayed, remote control receiver 34 receives an instruction from the user via remote controller 12 (S132).

When the instruction is received, controller 36 determines whether the instruction is an instruction issued to display a list of group titles each corresponding to a group of broadcast programs (S134). If so (YES at S134) controller 36 causes television receiver 14 to display group title list information (S136). Thus if the user's instruction indicates that group title list information should be generated controller 36 generate the group title list information.

When the group title list information is displayed, remote control receiver 34 receives an instruction from the user to display titles of broadcast programs of a group that is designated by the user (S138). When the instruction is received, controller 36 searches for and retrieves the titles' information (S140) and causes television receiver 14 to display the information (S152).

Thus in the present embodiment the hard disk recorder once causes television receiver 14 to display a list of group titles each corresponding to a group of broadcast programs and thereafter causes television receiver 14 to display titles of broadcast programs of a group designated by the user. The user can thus select a broadcast program in a reduced period of time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A broadcast program recorder comprising:
 a receiver receiving instructions from a user, said instructions including a first instruction issued to program recording a broadcast program, a second instruction issued to extract a group of broadcast programs periodically broadcasted and recorded, and a third instruction issued to change the location of a program in a playlist resulting in a user-defined order of reproduction;
 a tuner selecting a channel of a broadcast signal received by an antenna;
 a storing device for recording data, said data including broadcast program content data of a broadcast program corresponding to said channel selected by said tuner;
 a controller controlling an operation of the broadcast program recorder, said controller including:
 means for determining identification information specifying said broadcast program subject to programming of periodical recording, if said first instruction indicates that said periodical recording be programmed and also designates a periodical recording interval,
 means for setting said identification information to an unused series identification number when said periodical recording is first set to be recorded,
 wherein said unused series identification number is set independent of information obtained from Electronic Program Guide information and is set independent of a recording date or time,
 means for controlling said tuner to select said programmed channel when a time for which a recording is programmed arrives,
 means for controlling said storing device to record said broadcast program content data in association with said identification information,
 means for searching and retrieving said broadcast program content data corresponding to said identification information specified by said second instruction,
 wherein said identification information is set independent of information obtained from Electronic Program Guide information and is set independent of a recording date or time, and
 means for generating, in accordance with a result of searching and retrieving by said means for searching and retrieving and said third instruction, a play list representing an order in which said group of broadcast programs subjected to said programming of periodical recording is reproduced; and
 an output device outputting at least one of a video signal corresponding to said play list and a video signal corresponding to said broadcast program content data.

2. The broadcast program recorder according to claim 1, wherein said information independent of when a broadcast program is recorded includes information allowing a broadcast program to be individually identified.

3. The broadcast program recorder according to claim 1, wherein:
 said information stored in said storing device includes information of a title associated with said identification information;
 said controller further includes means for generating a group of information of titles associated with said identification information; and
 said output device outputs in addition to information representing said order of reproduction and information representing said broadcast program said group of information of said titles associated with said identification information.

4. The broadcast program recorder according to claim 3, wherein said output device outputs said group of information of said titles associated with said identification information, if a condition is satisfied.

5. The broadcast program recorder according to claim 3, wherein:
 said instruction received by said receiver further includes an instruction including designating a title; and
 said output device outputs said group of information of said titles associated with said identification information, if said receiver receives said instruction including designating a title.

6. The broadcast program recorder according to claim 1, wherein data of the storing device is periodically updated so that an earlier recorded broadcast program is recorded to a preceding address.

* * * * *